Feb. 5, 1935.  J. L. SHROYER  1,990,351
FRYING APPARATUS
Filed Dec. 29, 1932   2 Sheets-Sheet 1
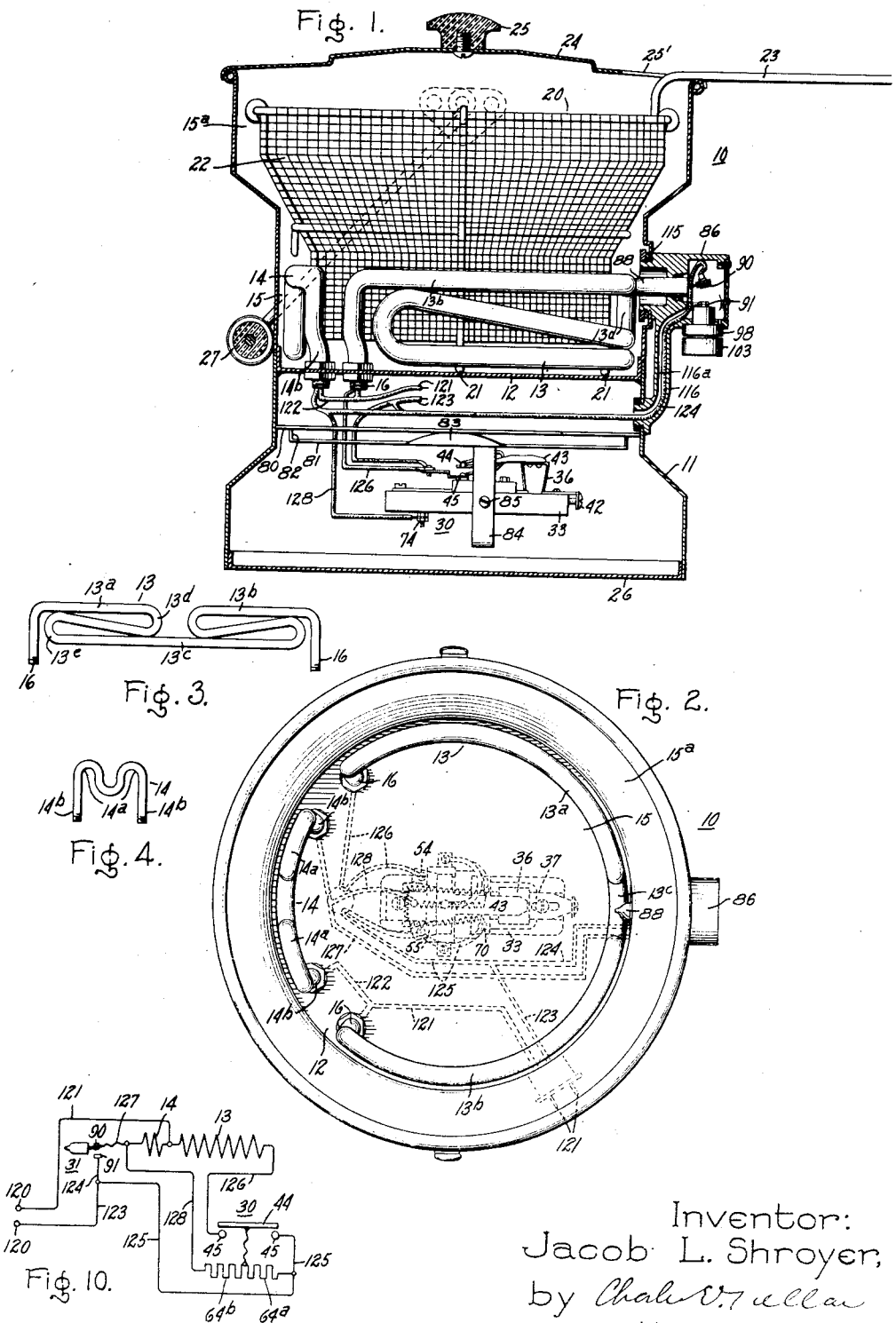
Inventor:
Jacob L. Shroyer,
by Charles V. Mullan
His Attorney.

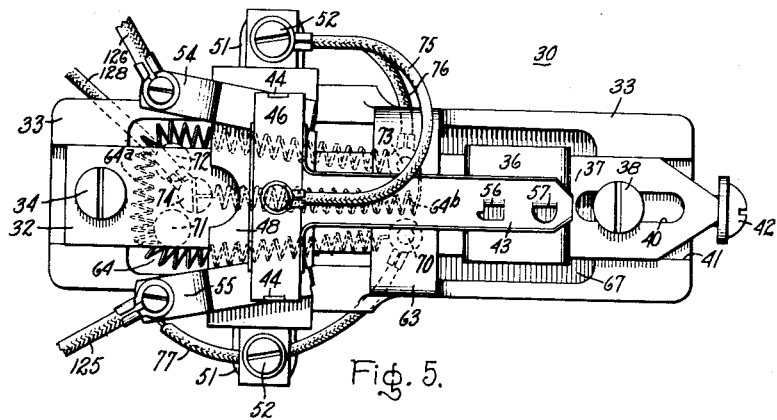
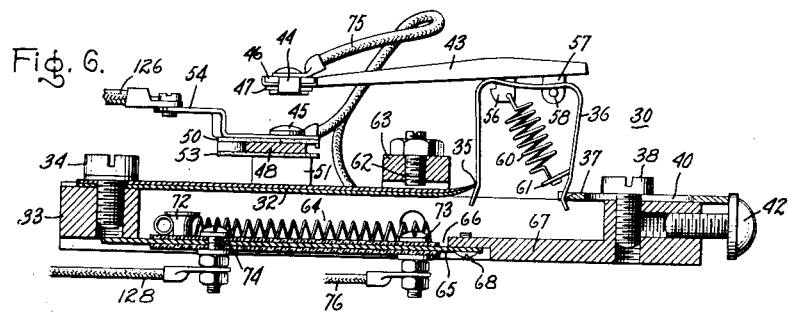
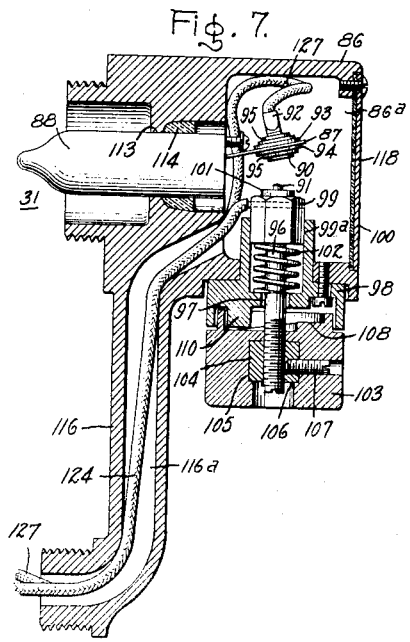
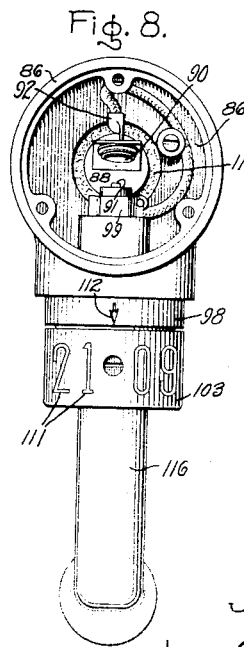
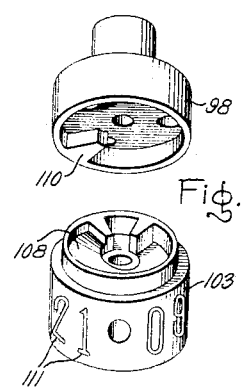

Patented Feb. 5, 1935

1,990,351

UNITED STATES PATENT OFFICE 1,990,351

FRYING APPARATUS

Jacob L. Shroyer, Oak Park, Ill., assignor to Edison General Electric Appliance Company, Chicago, Ill., a corporation of New York Application December 29, 1932, Serial No. 649,339

19 Claims. (Cl. 219—43)

My invention relates to frying apparatus, more particularly to fry kettles for use in the preparation of edibles, such as doughnuts, crullers, potatoes, meats, sea foods, etc. and has for its object the provision of improved frying apparatus of this character.

The frying operations of the above-mentioned character require a rather close control of the grease temperature in order to prevent a grease soggy or a grease hardened product. In addition to this, they call for an application of heat to the frying medium such that the medium substantially at the frying level of the kettle will be heated to a comparatively high frying temperature, while that in the lower portion of the kettle will remain comparatively cool. This is important, because if the grease in the lower portion of the kettle attains the relatively high temperature of that at the frying level, the sediment which drops from the edibles being fried and collects in the bottom of the kettle most likely would be charred or burned with the result that the frying medium would become tainted. This, of course, is undesirable both because the quality of the edibles being fried would be impaired and also because the tainted grease would not form a satisfactory frying medium for subsequent frying operations.

In accordance with my invention, I provide suitable immersion heating elements in the frying portion of the apparatus and arrange these elements along the side walls of the apparatus very close to these walls and also spaced somewhat from the bottom wall of the kettle. By reason of this arrangement the maximum available space in the frying portion of the kettle may be utilized for the frying operations; and while the temperature of the grease at the frying level is maintained at the desired value, the grease in the lower portion of the kettle is not heated above a comparatively low temperature; the temperature of the grease in the bottom of the kettle is so low that the sediment which falls from the edibles being fried will not be burned or charred.

Preferably, heating elements of the incased or sheathed type will be used, and preferably, these elements will be arranged in convolutions substantially surrounding the entire area of the space within the kettle devoted to frying.

Arranged within the kettle so as to be embraced by these heating elements is a suitable open-work basket for holding the edibles being fried.

The upper portion of the frying kettle is enlarged somewhat in cross-section so as to provide a space into which the foam arising in the frying operations from the fry portion of the kettle may flow and thereby prevent overflow of foam. Preferably, the open-work basket will be enlarged somewhat at its upper portion so as to follow the general contour of the upper portion of the kettle.

In the preferred form of my invention disclosed, two heating elements are provided—a main heating element and an auxiliary heating element. The auxiliary heating element is controlled to apply heat to the frying medium at all times during the operation of the device, whereas the main heating element is energized to supply the additional energy required to maintain the frying temperature when edibles are placed into the grease so as to be fried; when the device is idle the main heating unit is deenergized, and the auxiliary unit functions to maintain the grease substantially at the frying temperature.

Suitable temperature responsive means are provided for automatically controlling these elements to effect the above-described operation of the heater. For this purpose, the energization of the main heating element is controlled by means of a thermostat which is removed from the influence of the temperature of the frying medium. This thermostat is controlled by means of a heating device arranged to apply heat to the thermostat, and this heating device in turn is controlled by means of an auxiliary thermostat which responds directly to the temperature of the frying medium itself. The thermostats are arranged to control the heating elements as described above, that is so as to maintain the grease at a frying temperature, the auxiliary unit functioning to maintain substantially the frying temperature when the apparatus is idle, while the main heating unit is energized to maintain the temperature when edibles are placed in the kettle to be fried.

For a more complete understanding of my invention, reference should be had to the accompanying drawings, in which Fig. 1 is a vertical sectional view of frying apparatus embodying my invention; Fig. 2 is a plan view of the apparatus of Fig. 1, portions of the apparatus being removed so as to illustrate certain structural details; Figs. 3 and 4 illustrate heating elements used in the apparatus of Figs. 1 and 2; Fig. 5 is a plan view of certain temperature responsive mechanism used in the fry kettle of Fig. 1; Fig. 6 is a vertical sectional view of the thermostatic control mechanism shown in Fig. 5; Fig. 7 is a vertical sectional view of still another temperature control device used in the frying apparatus of Fig. 1; Fig. 8 is an end elevation of the apparatus shown in Fig. 7 with portions removed so as to illustrate certain structural details; Fig. 9 is an expanded view of a portion of the mechanism of Figs. 7 and 8; and Fig. 10 is a diagrammatical representation of certain heating elements used in the frying apparatus of Fig. 1, together with the control apparatus therefor arranged in accordance with my invention.

Referring to the drawings, I have shown my invention in one form in connection with frying apparatus adapted particularly for the frying of edibles. As shown, this frying apparatus comprises a grease container or kettle 10 supported upon a suitable base 11. The grease kettle 10 is provided with a bottom wall 12. The kettle 10, the base 11 and the bottom wall 12 are shown as separate members united together in any suitable manner, as by welding. It will be understood of course that these members may be formed from a single integral structure. And while it is not necessary, it is preferable that the grease kettle 10 and also the base 11 be given a circular cross-section.

The grease kettle 10 is heated by means of a pair of heating elements 13 and 14. These heating elements, as shown, are of the immersion type and are arranged about the periphery of the frying portion 15 of the kettle fitted as closely as is practical to the side walls of the kettle and spaced somewhat from its bottom wall. Preferably, the heating elements will be arranged in a series of convolutions extending along the side walls of the frying portion 15 so that they will substantially embrace the frying space and also will extend throughout substantially the full height of the frying space.

By reason of this arrangement practically the entire frying space is subjected to a source of heat distributed substantially uniformly over the area surrounding this space. In other words, the heating elements 13 and 14 constitute a heat generating wall surrounding the frying space of the kettle.

As shown, the heating element 13 extends substantially through 270° of arc of the circumference of the kettle and at its ends is provided with terminal portions 16 which extend through the bottom wall 12 of the kettle. This heating element is divided into two branches of convolutions 13a and 13b joined by a substantially straight portion 13c arranged along the bottom of the kettle. The convolutions of each set 13a, 13b are arranged longitudinally along the walls of the kettle and are spaced vertically. As shown in Figs. 1 and 2, each portion 13a, 13b comprises two reverse convolutions 13d and 13e, each having a distorted hair pin shape. The upper leg of the upper convolution 13d is connected with the terminal portion 16 which, as shown, is substantially upright in the kettle, while the lower branch of the lower convolution 13e merges into the central connecting portion 13c between the sets 13a and 13b. It will be understood that Fig. 3 illustrates a development of this heating element. The heating element 14 is arranged into a series of vertical convolutions 14a spaced at intervals about the portion of the periphery of the kettle (Figs. 1, 2 and 4). The heating element 14 is provided with terminal portions 14b extending through the bottom wall 12.

By reason of the afore-described arrangement of the heating elements, the grease in the lower portion of the kettle over substantially the entire bottom surface 12 will remain at a safe temperature which is below that at which food sediment will char or burn. At the same time, the grease at the frying level, which is approximately at the level of the upper edge of the heating elements, will be heated to the frying temperature.

The elements 13 and 14 cooperate to maintain the frying temperature while edibles are being fried; while the element 14 is used to maintain substantially this temperature while idle. In the particular application shown, the main heating element 13 may have a capacity of 1000 watts, while the element 14 may have a capacity of 320 watts, making a total maximum input of 1320 watts. This maximum input will be sufficient to maintain a suitable frying temperature of 350° to 400° F. The 320 watt temperature maintaining unit 14 will hold substantially the frying temperature when the apparatus is idle.

While any suitable heating elements may be used, I prefer to use sheathed or incased elements, such as described and claimed in U. S. Patent to C. C. Abbott No. 1,367,341, dated February 1, 1921, and comprising a coiled resistance element (not shown) embedded in a suitable heat conducting electrically insulating material (not shown), such as magnesium oxide, and enclosed in a metallic sheath. These heating elements can be easily bent or otherwise formed into the convolutions shown.

The portion 15a of the kettle 10 above the frying portion 15 is enlarged somewhat in diameter, as clearly indicated in Figs. 1 and 2, to provide a relatively large space above the frying portion to receive the foam which arises during frying operations. It will be understood that the portion 15a will be sufficiently large to receive the foam which normally overflows from the frying portion 15 during the frying operations so that there will be very little likelihood of any of the foam overflowing the kettle. If desired, and it is preferable to do so, the base 11 will be enlarged, as indicated, to conform in general to the shape of the enlarged upper portion.

It will be observed that the portion 15a by reason of its relatively large area acts somewhat as a heat radiator and it might be possible, if suitable steps were not taken to prevent it, that some heat loss would take place through this enlargement. To overcome this difficulty, I have made the kettle 10 of a suitable nickel-chromium alloy which has a very low thermal conductivity so that the heat losses through the enlarged portion 15a are reduced to a minimum. In the specific example shown, I use a nickel-chromium alloy having a chromium content of approximately 18% and a nickel content of approximately 7%, the remainder of the alloy being iron. By reason of this arrangement, I have found that when the fat at the frying level is approximately 400° F., it is possible to touch the top edge of the enlarged portion 15a without burning the hand. Likewise, the base 11 will be formed of a material having a relatively low thermal conductivity, such as the above-mentioned alloy. This eliminates the necessity for raising the apparatus from the table or other supporting member that it rests upon.

Arranged within the frying portion 15 is a suitable open-work basket 20 which is arranged to receive the edibles being fried. This basket, as shown, has a diameter which is substantially equal to the diameter of the frying space embraced by the heating elements, but yet which is sufficiently small to allow the basket to be readily placed in the frying space without interference from the heating elements. The basket 20 is supported in a position elevated above the bottom wall 12 by means of suitable legs 21. Preferably, the upper portion 22 of the basket will be flared outwardly to conform with the general enlarged portion 15a of the kettle. The basket is provided with a handle 23 whereby it may be readily placed within and removed from the kettle. The kettle is closed by means of a cover 24 which is provided with a slot 25 arranged to receive the handle 23. The cover is also provided with a suitable handle 25 whereby it may be conveniently placed upon and removed from the kettle. The base 11 of the kettle is closed by means of a cover 26.

The kettle 10 is provided with a suitable bail or handle 27 whereby it may be conveniently transported from place to place.

As previously pointed out, suitable means are provided for controlling the heating elements 13 and 14 in accordance with the temperature of the frying medium so that when the apparatus is being used to fry edibles, both elements will be energized to maintain a predetermined relatively high frying temperature, such as 350°–400° F., in the frying portion of the kettle, whereas when the apparatus is idle, the main heating element 13 will be deenergized while the heating element 14 will remain energized to maintain the frying medium substantially at the frying temperature.

For this purpose, the main heating element 13 is provided with a controlling thermostat 30 removed from the influence of the temperature of the frying medium. The thermostat 30 in its turn is controlled by means of a second thermostat 31 which does respond directly to the temperature of the frying medium. The thermostatic control structure is so arranged that when the temperature of the frying medium attains a predetermined low temperature, the main thermostat 30 will be controlled by the thermostat 31 to close an energizing circuit for the heating element 13, whereas when the frying medium attains a predetermined high temperature, the main thermostat 30 will be controlled to deenergize the heating element 13.

The thermostatic control device 30 may have any suitable structure, but preferably will be made in accordance with the temperature control device described and claimed in United States Patent to A. H. Simmons No. 1,743,073, dated January 7, 1930. As shown (Figs. 5 and 6) this thermostat comprises a bimetallic bar 32 made of two strips of metal having dissimilar temperature coefficients of expansion, such as brass and steel, these two strips being securely welded or brazed together lengthwise. The bar 32 is rigidly secured at one end to a support or base 33 by means of a clamping screw 34 passing through a suitable hole provided for it in the bar.

The movable end of the thermostat bar 32 is provided with a knife-edged pivot bearing 35 which rests in a bearing seat provided for it in one arm of an inverted U-shaped resilient member or spring 36. The other arm of this member 36 is seated on a fixed knife edged bearing 37. The bearing member 37 is secured to the base 33 by means of a clamping screw 38 passed through an elongated slot 40 provided for it in the bearing member. It will be observed that this slot is so arranged that the bearing member can be moved with respect to the member 36 so as to change the tension in the member. The member 37 slides in a suitable channel 41 provided in the base so that it is constrained to slide in the proper direction inwardly and away from the spring member 36. A suitable screw 42 is provided to insure the adjusted position of the clamping member and to lock it in its adjusted position.

As pointed out in detail in the above-mentioned Simmons patent, the spring member 36 applies an elastic force to the movable end of the thermostatic bar 32 so as to cause the bar to move quickly from its one controlling position to its other controlling position.

Secured to the base portion of the spring 36 is an actuating arm 43 which carries on its free end a bridging contact member 44 arranged to cooperate with a pair of fixed contacts 45 carried by the base 33. The bridging contact 44 is electrically insulated from the arm 43 by means of insulating strips 46 and 47 formed of some suitable insulating material, such as mica.

The two fixed contacts 45 are rigidly secured to a suitable supporting member 48 in electrically insulated relation with it, a suitable strip of insulating material 50 formed of any suitable insulating material, such as mica, being provided to insulate the contacts from the support. The bridging member 48 is secured to suitable ears 51 projecting laterally from the sides of the base by means of screws 52. A suitable strip of insulating material 53 is interposed between the supporting member 48 and the ears 51. This strip will be formed of any suitable material, such as mica. Leads 54 and 55 are in electrical contact with the two fixed contacts 45 respectively.

The contact arm 43 may be a resilient arm as described in the above-mentioned Simmons patent, but preferably will be formed as a rigid arm, as shown, and connected with the spring member 36 by means of a resilient connection, as described and claimed in the copending application of Francis H. McCormick, Serial No. 575,593, filed November 17, 1931 and assigned to the same assignee as this invention. As there described, the contact arm 43 is provided on its underside with a pair of lugs 56 and 57, which are passed through apertures provided for them in the base of the spring member. Through the lower end of the lug 57 is passed a retaining pin 58. The lugs 56 and 57 are so arranged that the arm 43 has limited relative pivotal movement with respect to the spring member. The switch arm 43 is biased toward the base of the spring member by means of a suitable tension spring 60 which, as shown, is connected at one end to the lug 56 and at its opposite end is connected with a lug 61 carried by the leg of the U-shaped spring member that bears on the member 37.

A suitable adjustable stop member 62 is provided to limit the motion of the bimetallic bar in its upward direction, as shown in Fig. 5. This stop thereby establishes one controlling position of the bar which, as shown, corresponds to the open position of the switch. This adjustable stop is carried by a suitable member 63 formed on the base, preferably integrally with it.

Mounted in the base 33 is a suitable heating element 64 arranged so as to apply heat to the bimetallic bar 32. This heating element is carried by means of a plate 65 which closes an opening 66 arranged in the bottom wall 67 of the base 33 and is secured to the base by any suitable means such as screw fastening means 68. One end of the heating element 64, as shown, is secured to a terminal 70 secured to the plate 65 and from this terminal is threaded about a pair of lugs 71 and 72 so as to be formed into a heating section 64a of substantially U-shape beneath the bimetallic bar. The leg of the U-shaped element opposite that connected with the terminal 70 is connected with a second terminal 73 and from this terminal is extended to a central heating section 64b extending between the legs of the U-section and substantially parallel with these legs. The heating section terminates in a terminal 74.

The terminal 73 is electrically connected with the central portion of the bridging contact 44 by means of conductors 75 and 76 connected respectively with the bridging contact and with the terminal. These conductors are anchored to one of the ears 51 by means of the screw fastening means 52; the conductors make electrical contact with each other at their point of attachment to the ear. It will be observed that by reason of this arrangement, the heating section 64a will be short circuited when the bridging contact is in engagement with the fixed contacts 54. The terminal 70 is electrically connected with the lead 55 by means of a conductor 77.

In the operation of the device it will be understood that the bimetallic bar will be controlled in accordance with the energization of the heating element 64. When the heating element 64 is deenergized the bimetallic bar 32 will be held upward by the spring 36 to maintain the switch contacts 45 open, and as long as the element 64 is cold, the thermostat will continue to hold these contacts open. When the element 64 is energized, however, and the temperature of the thermostat rises, the distortion of the bar tends to move its free end downwardly and upon the occurrence of a predetermined maximum temperature for which the device is set to operate will rapidly accelerate to its neutral position and will be carried through its neutral position, and then to its opposite controlling position, i. e., its switch closing position, by the spring member 36 which will function to rapidly move it from its neutral to its closed switch position. This operation closes the switch contact. As previously pointed out, when the switch is closed, the heater section 64a of the heating element 64 will be short-circuited. The remaining portion 64b, however, has a sufficient capacity to heat the bar 32 sufficiently to cause it to hold the switch closed. When the branch 64b is deenergized, the thermostat bar will operate to open the switch.

The thermostat 30 is mounted within the base 11 below the bottom wall 12 and is supported therein by means of a pair of baffles 80 and 81 interposed between the thermostat and the bottom wall of the kettle. The upper baffle 80, which is of disc form, is secured to the inner walls of the base 11 in any suitable manner, as by welding, while the lower baffle 81 is secured to the upper baffle 80. The lower baffle, as shown, is provided with up-turned flanges 82 and with a detent 83 which are secured directly to the baffle 80 and which function both to secure the baffles together and to space the lower from the upper baffle. The lower baffle 81 carries depending brackets 84 which are secured at their upper ends to the baffle 81 in any suitable manner, as by welding, and at their lower ends carry screw fastening means 85 received by the base 33 so as to support the thermostat 30.

It will be understood that the baffles 80 and 81 not only function to support the thermostat 30, but also function to thermally insulate it from the frying medium within the kettle 10 so that the thermostat is removed from the influence of the temperature of the frying medium.

The thermostat 31 for controlling the thermostat 30 is mounted in a housing 86 which in turn is mounted on the side wall of the frying kettle 10, as shown in Fig. 1. The thermostat 31, as shown, comprises a bimetallic thermostat bar 87, mounted within a tubular member 88. The inner end of the bar 87 is fixedly secured within a tubular member 88. The inner end of the bar 87 is fixedly secured within the tubular member and its free end projects from the tubular member into a chamber 86a of the housing 86.

The movable end of the bimetallic bar caries a contact 90 which is arranged to cooperate with a fixed contact 91 carried by the housing 86. The contact 90 is formed as a stud which extends through an aperture (not shown) provided for it in the movable end of the bimetallic bar 87. The upper end of the stud 90 is electrically connected with a suitable lead 92. Suitable mica strips or washers 93 and 94 are positioned on opposite sides of the bimetallic strip 87. Interposed between the lower end of the stud 90 and the next adjacent insulating washer 94 and between the other insulating washer 93 and the lead member 92 are suitable washers 95.

The contact 91 is mounted in the lower portion of the housing 86. The contact 91 is carried by means of a pin 96 which is arranged to slide vertically through an aperture 97 provided for it in a member 98 inserted in the bottom wall of the chamber, as shown in Figs. 1, 7 and 8. The upper end of the contact pin 96 is received by and is arranged to slide in a hexagonal nut-like member 99 which in turn is received in a bore 99a of corresponding cross-section provided for it in a member 100 projecting upwardly from the member 98 into the chamber 86a. This member 99 rests against a collar 101 carried by the upper end of the contact pin 96 and is biased against this collar by means of a suitable compression spring 102.

The lower portion of the contact stud which projects from the aperture 97 is secured to a knob-like member 103. As shown, the lower end of the stud is threaded, and screwed onto this threaded portion is an insert 104 which is received in a recess 105 provided for it in the member 103; the insert is secured by means of a shoulder 106 on the knob and also by means of a set screw 107.

The knob 103 is arranged so that the position of the contact 91 in the housing 86a can be adjusted by rotating the knob. As shown, the knob 103 is provided with an inclined surface 108 which cooperates with an abutment or projection 110 arranged on the bottom of the member 98. When the knob 103 is turned in the counterclockwise direction, as viewed from the bottom, the inclined surface 108 will engage the projection 110 so as to move the knob and its connected contact 91 downwardly, whereas if the knob is rotated in the reverse direction, the contact 91 will be moved upwardly within its housing under the influence of the compression spring 102.

In view of the foregoing description, it will be clear that by turning the knob 103 the position of the switch contact 91 can be adjusted and hence, the temperature setting of the thermostat 31 can be adjusted. The knob 103 may be provided with suitable temperature indications or characters 111 which cooperate with a fixed index 112 on the member 98.

The tubular housing 88 for the bimetallic bar, as shown, is mounted in the housing 86 so as to project through a suitable aperture 113 provided for it in the housing and thereby, be immersed in the frying medium in the kettle. It will be understood that the housing 86 will be mounted in an aperture provided for it in the side wall of the housing so that the protruding portion of the thermostat housing 88 will be immersed in the grease in the kettle. A suitable leak-proof joint 114 will be provided between the housing 86 and the tubular housing 88. Likewise, a suitable leak-proof joint 115 will be provided between the housing 86 and the wall of the grease kettle.

It will be observed that the tube 88 housing the thermostat bar 87 is immersed in the grease adjacent the upper portion of the main heating element 13 in the path of the grease that flows directly from the element 13 in the course of the natural circulation of the grease set up by the element. This arrangement is important because it effects a very sensitive and close temperature regulation of the grease in the frying region—much closer than could be obtained if the thermostat 31 responded to the temperature of the grease in any other portion of the kettle—such as in the center of the kettle, or at its bottom. The sensitivity of control is increased because the temperature of the grease that directly leaves the heating unit 13 responds almost immediately to the energization and deenergization of the heating unit 13; that is, the temperature of the grease directly above the unit 13 changes more rapidly in response to the operation of the unit to apply and shut-off the heat than does the grease in other portions of the kettle. Consequently, my temperature control operating in response to the temperature of the grease in the region of the kettle immediately above the unit 13 will give a very sensitive control.

The housing 86 is provided with an extension 116 which is provided with a channel 116a that communicates with the chamber 86a at its upper end and with the interior of the base 11 of the kettle at its lower end. It is through this channel that the necessary connections for the thermostat 31 are directed.

The chamber 86a is closed by a suitable cover 118.

The electrical connections between the two thermostats 30 and 31 and the heating elements 13 and 14 are shown diagrammatically in Fig. 10. As shown in this figure, one terminal 16 of the main heating element 13 is electrically connected by means of a conductor 121 to one of a pair of terminal supply pins 120, which, as is well understood by those skilled in the art, are arranged to receive the socket (not shown) of a suitable twin supply conductor (not shown). The conductor 121 is also electrically connected to one of the terminals 14b of the heating element 14 by means of a conductor 122 (Fig. 2). The other terminal 120 of the twin supply terminal, as shown, is electrically connected by means of a conductor 123 and a conductor 124 with the contact 91 of the thermostat 31 and by means of the conductor 123 and a conductor 125 with the lead 55 and its connected fixed terminal 45 of the thermostat 30 and also by means of these conductors and the conductor 77 with the terminal 70 of the heating element 64 for the thermostat 30. The lead 54 of the other terminal 45 of the thermostat 30 is connected with the remaining terminal 16 of the main heating element 13 by means of a conductor 126. The movable contact 90 of the thermostat 31 is electrically connected by means of a conductor 127 with the remaining terminal 14b of the heating element 14 and with the terminal 74 of the heating element 64 provided for the thermostat 30 by means of conductor 127 and a conductor 128, as shown clearly in Fig. 2.

In the operation of the apparatus, let it be assumed that the kettle portion 15 has been filled with the proper quantity of grease or some other suitable frying medium, and that the grease be cold; and further, let it be assumed that a suitable supply conductor be plugged into the terminals 120. Then under these conditions, both thermostats 30 and 31 will be in their open positions, as shown in the diagrammatic view in Fig. 10. Moreover, the auxiliary heating element 14 will be energized through a circuit which may be traced from one terminal pin 120, through the conductor 121, thence through the heating element 14 and through the conductor 128 to the heating element 64 provided for the thermostat 30. By reason of these connections, the heating element 14 will function to heat up the cold grease, and at the same time the heating element 64 will be energized so as to apply heat to the thermostatic element 32 of the thermostat 30.

When the heating element 64 has attained a predetermined temperature, the thermostatic bar 32 will operate to close its bridging contact 44, thereby energizing the main heating element 13 through a circuit which may be traced from the terminal pin 120, through the conductor 121, the heating element 13, the bridging contact 44 of the thermostat 30 and thence through the conductors 125 and 123 to the other supply terminal 120. When the bridging contact 44 closes to energize the main heating element 13, it will short circuit the portion 64a of the heating element 64, thereby leaving only the portion 64b energized. This portion, however, as has been pointed out, generates sufficient heat to maintain the thermostatic bar in position to maintain the switch closed.

Both heating elements 13 and 14, therefore, will be energized so as to bring the grease up to a suitable frying temperature, such for example as 400° F. The temperature to which the grease is heated will, of course, depend upon the setting of the knob 103. When the fat attains a predetermined temperature which is determined by the setting of the knob 103, the thermostat 31 will function to close its contacts 90 and 91, which operates short-circuits the entire heating element 64 provided for the thermostat 30. The deenergization of the heating element 64 allows the thermostatic blade 32 to cool so that eventually it will move to open its switch contacts and hence, deenergize the main heating element 13. The auxiliary heating element 14, however, will remain energized so as to maintain the grease substantially at the frying temperature through a circuit from the terminal 120, through the conductor 121, the heating element 14, and thence through the closed contacts 90 and 91 of the thermostat 31 and the conductors 124 and 123 to the other pin 120 of the supply terminals.

As long as no edibles have been placed into the fry kettle, the element 14 will be energized so as to maintain substantially the frying temperature in the kettle.

When the basket 22 with edibles in it are placed into the grease, however, the grease will naturally cool somewhat; as a result of this, the thermostat 31 will open its contacts 90 and 91 so as to effect the reenergization of the heating element 64. This element heats up and, as before, causes the thermostat 30 to operate to close an energizing circuit for the main heating element 13. This element then cooperates with the heating element 14 to quickly bring the grease up to the frying temperature and to maintain this temperature while the edibles are being fried.

When the edibles are removed, the grease will tend to heat up and eventually will attain such a temperature that the thermostat 31 will operate to close its contacts, thereby short-circuiting the resistance 64. As a result, the thermostat 30 will function to deenergize the heating element 13.

It will be understood that when edibles are being fried and energy is being supplied to the grease by both of the elements 13 and 14, that if the temperature tends to rise above the predetermined value for which the thermostat 31 is set, this thermostat will then function to close its contacts, thereby effecting the deenergization of the element 64 for the thermostat 30. This, as previously explained, will effect the deenergization of the main heating element 13. On the other hand, if the grease temperature falls below the frying temperature, the thermostat 31 will function to reenergize the heating element 64 which, as before, will cause its thermostat 30 to function to reconnect the main element with the supply source. In this manner my control system operates to maintain a predetermined mean frying temperature while edibles are being fried. When the apparatus is idle, the element 14 will be energized to maintain substantially the frying temperature.

More specifically, if for a given kettle the heating elements 13 and 14 have capacities of 1000 and 320 watts respectively, as previously assumed, and if the range of the thermostat 31 be such that a frying temperature range of 350°–450° F. can be had, then the element 14 alone will maintain a temperature of approximately 350° F. when the apparatus is idle. The unit 13 will be controlled by the thermostats 30 and 31 to supply the additional energy required when edibles are placed in the kettle so as to maintain the frying temperature at any value between the limits of 350°–450° F. which is selected by the setting of the knob 103.

It will be observed that my fry kettle has a relatively simple construction and yet is highly efficient in its operation. The arrangement of the heating elements around the periphery of the inner walls of the kettle is an extremely important feature of my invention in that while the grease at the frying level is held at a relatively high frying temperature, the temperature of the grease in the lower portion of the kettle will remain at a relatively low value so that it is impossible for sediment and like materials to be tainted or burned. Thus, it is unlikely that the edibles being fried will be tainted. Moreover, as the grease remains pure, it may be used over and over again.

The arrangement of the temperature control means for the heating elements 13 and 14 is also of importance in that it is possible to provide a quick make and break thermostat 30 for the main heating element 13 which carries the major portion of the heating load, while using a relatively slow make and break thermostat 31 to control the operation of the main thermostat. The load, of course, carried by the thermostat 31 is relatively low as compared with the load carried by the main thermostat.

Moreover, the provision of the slow make and break thermostat 31 effects a much more sensitive temperature control than if the main thermostat 30 were caused to respond directly to the grease temperature, because the latter thermostat having a snap action necessarily has a relatively large temperature range between the temperatures at which it snaps on and off, and hence, could not hold a very close grease temperature. The auxiliary slow make and break thermostat 31, which controls the heater 64 of the main thermostat, does not have this large temperature range and hence, the sensitivity, of my control is not impaired by using the large temperature amplitude snap action thermostat 30 to carry the main heating current load; the latter thermostat is quickly heated by the heater 64 to close and thereby apply heat to the grease when the heater 64 is energized by the thermostat 31 in response to a very small decrease in the temperature of the grease below the selected value, and likewise, is quickly cooled to open and thereby shut off the heat when the heater 64 is deenergized by the thermostat 31 in response to a relatively small increase in the grease temperature above the selected value.

The sensitivity of my control is further enhanced by locating the auxiliary thermostat 31 in the path of the grease directly after it leaves the main heating element 13 in the course of the natural circulation of the grease. This arrangement, as has been pointed out previously, holds a very close temperature in the grease in the frying region.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. Frying apparatus comprising a grease kettle having a sediment well in the lower portion thereof, a basket in said kettle for receiving edibles and the like, and an immersion heating element within said kettle spaced from its bottom wall and fitted closely to its side walls about said basket so as to establish a frying region within said basket at a height materially above said sediment well.

2. Frying apparatus comprising a grease kettle and an incased heating element within said kettle arranged closely to the side walls of said kettle and formed into a plurality of longitudinally arranged convolutions extending through a substantial portion of the length of said walls and spaced vertically of said walls so as to provide a substantially uninterrupted frying space within said kettle, and so as to heat the frying medium at the frying level substantially uniformly to a frying temperature.

3. Frying apparatus comprising a grease kettle and immersion heating means within said kettle fitted closely to its side walls and comprising a heating element formed into a plurality of heat generating convolutions covering a substantial area of said walls so as to heat the grease at the frying level of said kettle to a relatively high frying temperature, while that in the bottom of said kettle remains comparatively cool.

4. Frying apparatus comprising a grease kettle and immersion heating means within said kettle substantially surrounding the frying space of said kettle and extending through a substantial portion of the length of said frying space so as to apply heat to substantially all sides of said frying space and through a substantial portion of its height.

5. Frying apparatus comprising a grease kettle and an incased heating element within said kettle having elongated convolutions extending around the periphery of the frying space of said kettle and spaced vertically so as to apply heat to a substantial portion of the length and height of said space and thereby heat the frying medium at the frying level of said kettle to a comparatively high temperature, while that in the lower portion of said kettle remains comparatively cool.

6. Frying apparatus comprising a kettle, an openwork basket in said kettle arranged to hold the edibles being fried and immersion heating means within said kettle surrounding said basket.

7. Frying apparatus comprising a grease kettle having a frying portion and a portion above said frying portion of enlarged cross-section providing a space for receiving the foam arising in frying operations.

8. Frying apparatus comprising a grease kettle formed of a nickel-chromium-iron alloy having a chromium content of approximately 18% and a nickel content of approximately 7%, said kettle having a frying portion and a portion above said frying portion of enlarged cross-section providing a space for receiving the foam arising in the frying apparatus so as to prevent the over-flow of foam from said kettle.

9. Frying apparatus comprising a grease kettle, an immersion heating element of relatively large capacity in said kettle, a second immersion heating element of relatively low capacity in said kettle and means responsive to the temperature of the frying medium controlling said element of larger capacity to maintain a predetermined temperature in the grease in said kettle while edibles are being fried.

10. Frying apparatus comprising a grease kettle, a temperature maintaining heating unit for the frying medium in said kettle, means for connecting said unit with a source of electrical supply, a second heating unit for said kettle arranged to maintain a frying temperature in said frying medium while edibles are being fried, a temperature responsive device removed from the influence of the temperature of said frying medium controlling said second heating unit, means for applying heat to said temperature responsive device and means controlling said heating means responsively to the temperature of said frying medium.

11. Frying apparatus comprising a kettle, a plurality of heating units for said kettle having a combined capacity equivalent to that necessary to maintain the frying medium at frying temperature while edibles are being fried and one of said units having a capacity to maintain the frying medium heated when said apparatus is idle, electrical connections for said heating units arranged to connect them with a source of supply, a temperature responsive device in said connections arranged to control the energization of one of said heating units, a heating device arranged to apply heat to the temperature responsive device to control its operation and a second temperature responsive device in thermal relation with the frying medium controlling said heating device jointly with said first temperature responsive device so as to control the operation of said first temperature responsive device and hence, the operation of the associated heating unit, in accordance with the temperature of said frying medium.

12. Frying apparatus comprising a kettle, a main heating unit in said kettle, and an auxiliary heating unit in said kettle arranged to maintain the temperature of the frying medium when said main heating unit is deenergized and said apparatus is idle, a source of electrical supply for said units, a temperature responsive device removed from the influence of the temperature of said frying medium controlling said main heating unit, a third heating unit for applying heat to said temperature responsive device so as to control its operation, electrical connections between said auxiliary and said third heating units and said source of supply, a second temperature responsive device in thermal relation with said frying medium in said connections controlling the energization of said third heating unit in accordance with the temperature of said frying medium so that when said medium attains a predetermined high temperature, the third heating unit is deenergized, whereby said first temperature responsive device operates to deenergize said main heating unit, and when said frying medium attains a predetermined low temperature, said third heating unit is energized to apply heat to the second temperature responsive device to close it and thereby effect the energization of said main heating unit, and electrical connections for said third heating unit controlled by said first temperature responsive device so that when said device operates in response to the energization of said third unit to close the energizing circuit for said main heating unit, a portion of said third heating unit is short-circuited leaving a portion energized that applies sufficient heat to said thermostat to maintain it closed.

13. Frying apparatus comprising a grease kettle, a main heating unit in said kettle, a thermostat removed from the influence of the temperature of the frying medium in said kettle controlling the energization of said main heating unit, a heating device in thermal relation with said thermostat so as to control its operation, an auxiliary heating unit in said kettle, electrical connections between said auxiliary heating unit and said heating device and between said members and said source of supply, a second thermostat responsive to the temperature of said frying medium controlling said connections so that when said medium attains a predetermined low temperature, said heating device is connected with said auxiliary heating unit to said source of supply so as to be energized and thereby apply heat to said first thermostat to cause it to effect the energization of said main heating unit, and when said medium attains a predetermined high temperature, said heating device is disconnected from said supply source to thereby effect the operation of said first thermostat to open the energizing circuit of said main heating unit, said heating device being controlled by said first thermostat so that when the thermostat is operated to close the energizing circuit for said main heating unit, a portion of said heating device is rendered ineffective, the effective portion remaining being sufficient to maintain said thermostat in its operative position to maintain an energizing circuit for said main heating unit.

14. Frying apparatus comprising a frying kettle, a heating unit in said kettle for applying heat to the frying medium in said kettle, a thermostat removed from the influence of the temperature of the frying medium controlling the energization of said heating unit, a heating device in thermal relation with said thermostat for applying heat to control its operation and a second thermostat in thermal relation with the frying medium in said kettle controlling the energization of said heating device whereby said heating unit is controlled in accordance with the temperature of the frying medium.

15. Frying apparatus comprising a frying kettle, a plurality of immersion heating elements in said kettle arranged along the inner surfaces of the walls of the kettle formed into convolutions extending throughout a substantial portion of the height of the frying portion of said kettle and throughout substantially the complete periphery of said frying portion, means for connecting one of said elements with a source of electrical supply so that during the operation of said kettle said element is continuously energized and thermostatic means controlling the energization of the other of said elements in accordance with the temperature of the frying medium so that when edibles are being fried said element is energized to cooperate with the other element to maintain a predetermined frying temperature, whereas when said apparatus is idle, said second element is deenergized while the other element remains energized to maintain the frying medium in a heated condition.

16. Frying apparatus comprising a grease kettle and an immersion heating element within said kettle arranged above the bottom wall of said kettle and closely to its side wall and extending through a substantial portion of the length of said side wall and temperature responsive means controlling the energization of said heating element located in said kettle adjacent said heating element in the path of the grease directly after it leaves said heating element in the course of its natural circulation from said element.

17. Frying apparatus comprising a grease kettle, a heating element within said kettle formed into a plurality of convolutions covering a substantial portion of the area of the side wall of said kettle, and means controlling the energization of said heating element including a temperature responsive device arranged to respond to the temperature of the grease in said kettle substantially at the top of said convolutions where the grease leaves said heating element in the course of its natural circulation.

18. Frying apparatus comprising a grease kettle, a main heating element within said kettle adjacent the inner side wall of said kettle and spaced from the bottom wall thereof, a temperature maintaining heating element within said kettle adjacent said side wall and spaced from said bottom wall, means controlling the energization of said main heating element and a temperature responsive device controlling said last named controlling means positioned within said kettle adjacent the upper portion of said main heating element in the path of the grease that flows directly from said main heating element in the course of the natural circulation of the grease.

19. Frying apparatus comprising a grease kettle, a temperature maintaining heating unit for the frying medium in said kettle, means for connecting said heating unit with a source of electrical supply, a main heating unit for said kettle arranged to maintain a frying temperature in said frying medium while edibles are being fried, a temperature responsive device removed from the influence of the temperature of said frying medium controlling said main heating unit, heating means for applying heat to said temperature responsive device and a second temperature responsive device controlling said heating means located in said kettle adjacent the upper portion of said main heating unit so as to control said first temperature responsive device in accordance with the temperature of the grease that flows directly from said main heating element in the course of the natural circulation of the grease set up by said heating element.

JACOB L. SHROYER.